United States Patent [19]
Eisinga

[11] Patent Number: 5,792,348
[45] Date of Patent: Aug. 11, 1998

[54] STEEL REINFORCED FILTER PRESS PLATES

[75] Inventor: Hendrik Eisinga, Houston, Tex.

[73] Assignee: Filtration Products Ltd., Houston, Tex.

[21] Appl. No.: 728,260

[22] Filed: Oct. 8, 1996

[51] Int. Cl.$^6$ ............................................. B01D 25/12
[52] U.S. Cl. .................... 210/224; 210/231; 100/197
[58] Field of Search ...................... 210/224, 227–229, 210/231, 350; 100/197, 211, 295

[56] References Cited

U.S. PATENT DOCUMENTS

| | | | |
|---|---|---|---|
| 813,395 | 2/1906 | Allbright | 210/231 |
| 3,507,739 | 4/1970 | Jacobs | 100/295 |
| 3,615,015 | 10/1971 | Busse et al. | 210/231 |
| 4,397,746 | 8/1983 | Kratochvil | 210/350 |
| 4,839,045 | 6/1989 | Wildner | 100/211 |
| 4,997,560 | 3/1991 | Häberle . | |
| 5,021,155 | 6/1991 | Stanik . | |
| 5,071,554 | 12/1991 | Sieta et al. . | |
| 5,100,548 | 3/1992 | Oelbermann . | |
| 5,100,551 | 3/1992 | Pall et al. . | |
| 5,316,678 | 5/1994 | Heaslip . | |
| 5,437,796 | 8/1995 | Brüschke et al. . | |

FOREIGN PATENT DOCUMENTS

| | | | |
|---|---|---|---|
| 324866 | 7/1989 | European Pat. Off. | 210/224 |
| 2002302 | 7/1971 | Germany | 210/231 |
| 2709676 | 9/1977 | Germany | 210/231 |
| 1410645 | 10/1975 | United Kingdom | 210/231 |
| 1569295 | 6/1980 | United Kingdom . | |

OTHER PUBLICATIONS

Brochure of Fletcher Filtration Ltd. entitled *Steel Reinforced Rubber Moulded Recessed Plates and Filter Plates and Frames. Polypropylene filter plates*, consisting 10 pages.

Brochure of Klinkau GmbH+Co. entitled *KLICO—membrane filterplate—the successful technology of filtration*, consisting 16 pages.

1994 Brochure of Filtration Products Ltd. entitled *Polypropylene Filter Plates and Accessories*, consisting 4 pages.

*Primary Examiner*—Matthew O. Savage
*Attorney, Agent, or Firm*—Liddell, Sapp, Zivley, Hill & LaBoon, L.L.P.

[57] ABSTRACT

Steel reinforced filter plates consist of an inner steel sheet and front and back panels composed of thermoplastic resin. The front and back panels of the filter plate are composed of thermoplastic synthetic resin and are bond to each other through a series of prefabricated openings in the steel sheet. The inner steel sheet of the filter plate of the invention further contains at least one exit port hole and a drainage channel leading from the port hole. The filter plate further contains a feed port (passageway) extending from the exterior of the front panel to the back panel. The thermoplastic synthetic resin encompasses all of the exposed surfaces of the filter plate—all of the steel lining the prefabricated openings, port holes and drainage channel being encased by thermoplastic synthetic resin. The filter plate of the invention is produced via an injection molding process wherein a prefabricated steel sheet is first inserted between the upper and lower regions of a mold. Thermoplastic synthetic resin is then injected into the mold under conditions to favor bonding of the front and back panels of the filter plate by the thermoplastic synthetic resin filling the prefabricated openings.

25 Claims, 5 Drawing Sheets

STEEL REINFORCED FILTER PRESS PLATES

SPECIFICATION

1. Field of the Invention

The present invention relates to a plate for a filter press. In particular, the invention relates to a novel filter plate which may be employed in a multitude of capacities, including chamber plates and membrane filter plates. Further, the invention relates to a method of manufacturing such plates.

2. Background of the Invention

Filter presses use a plurality of components. Filter plates typically have ridged or grooved frontal surfaces turned toward the filter cloth and have drainage channels in their output compartments. The feedstock is introduced into the central feed port and the liquid phase is extracted along the channels forming the back panel, with the solid phase of the suspension left on the filter cloth.

To further remove moisture from the filter cake, the center panels of filter plates are constituted as membranes and the plates have sufficient elasticity and resiliency that their center panels can be pushed toward each other to press the solid phase. The filter cake is then back flushed or otherwise emptied from the filter press.

Filter presses are used in a wide variety of applications including in the production of dyestuffs, paints and varnishes, in chemical processing, ceramics, mining, effluent and sewage treatments, dewatering processes, metal purification, industrial effluents, food processing and breweries.

Polypropylene filter plates have been used extensively in the United States for many years. Polypropylene offers several advantages over the materials of the prior art. First, being lightweight, polypropylene based filter plates are easier to handle. Second, such filter plates are strong and highly stable under stress. Third, polypropylene is non-corrosive to acids and alkalis and thus polypropylene filter plates are resistant to abrasion, heat and chemicals. Fourth, polypropylene is immune to moisture and penetration. Lastly, the grooves of polypropylene filter plates tend not to deform at high working pressures.

Numerous patents disclose the use of polypropylene filter plates. See, for instance, U.S. Pat. No. 4,490,321, herein incorporated by reference. Unfortunately, when operated at high pressure, the center web of the polypropylene filter plates of the prior art flex, thereby causing breakage. Insufficient filtration further results from such flexing action.

SUMMARY OF THE INVENTION

The invention relates to homogeneous steel reinforced filter plates. The filter plate of the invention comprises an inner steel sheet and front and back panels composed of thermoplastic resin. The inner steel sheet has a series of prefabricated openings such as connection holes and support boss holes. The front and back panels of the filter plate are bonded to the inner steel sheet through the connection holes and support boss holes; the thermoplastic synthetic resin extending from the front to the back panels of the filter plate through the connection holes and support boss holes. The inner steel sheet of the filter plate of the invention further contains at least one drainage channel leading to the outside of the filter plate. The front and back panels of the filter plate contain at least one port hole for receiving treated liquid; the port hole leading into the drainage channel. The filter plate further contains a feed port (passageway) extending from the front to the back panel. The external perimeter of the passageway consists of thermoplastic synthetic resin. The steel layer surrounding the prefabricated openings and drainage channel are completely encased by thermoplastic synthetic resin. The filter plate of the invention may further be used as the body plate in membrane filter plates; the body plate does not contain the port hole.

The filter plates of the invention may be produced by an injection molding process wherein a prefabricated steel sheet is first inserted between the upper and lower regions of a mold. The steel sheet contains the prefabricated openings such as the connection holes and/or support boss holes as well as the central feed hole. The sheet is typically centered within the mold. Thermoplastic synthetic resin is then injected into the mold under conditions to favor bonding of the front and back panels of the filter plate by the thermoplastic synthetic resin filling the prefabricated openings.

BRIEF DESCRIPTION OF THE DRAWINGS

FIG. I is a frontal view of the steel sheet of the filter plate of the invention.

FIG. II is a frontal view of the filter plate of the invention.

Figure 1:
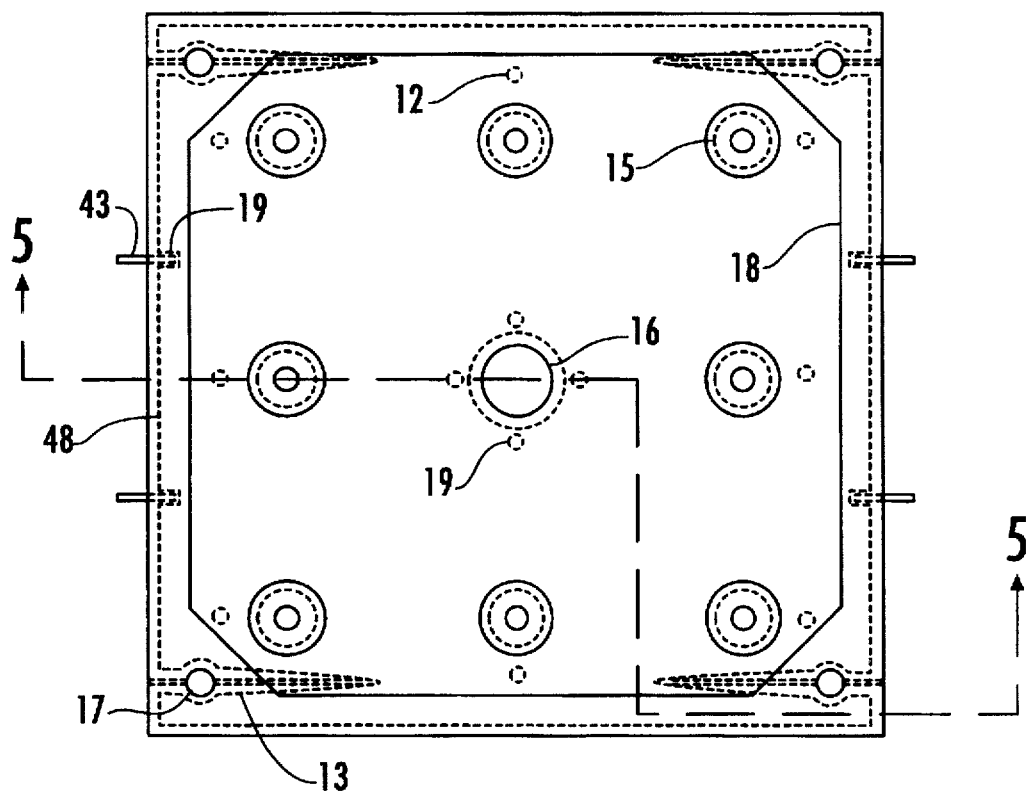
Figure 2:
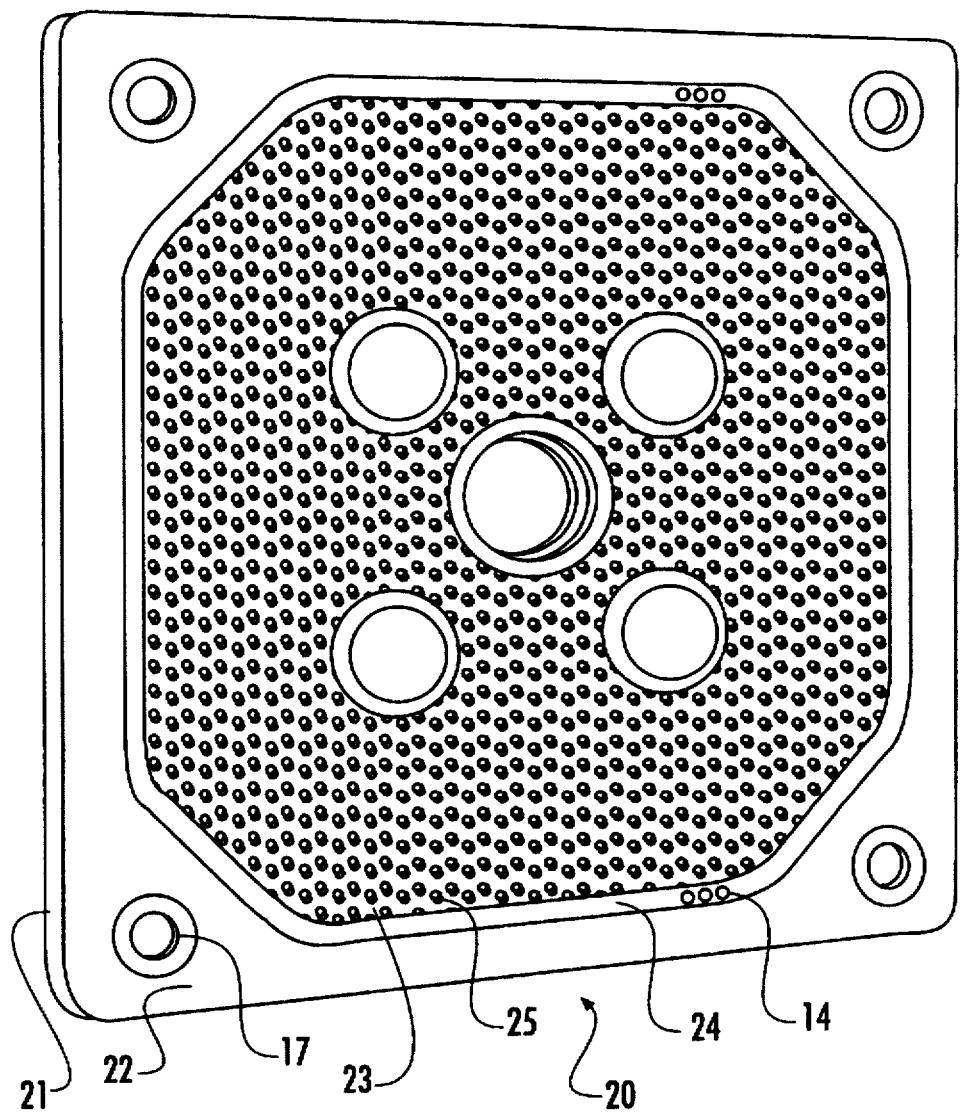
Figure 3:
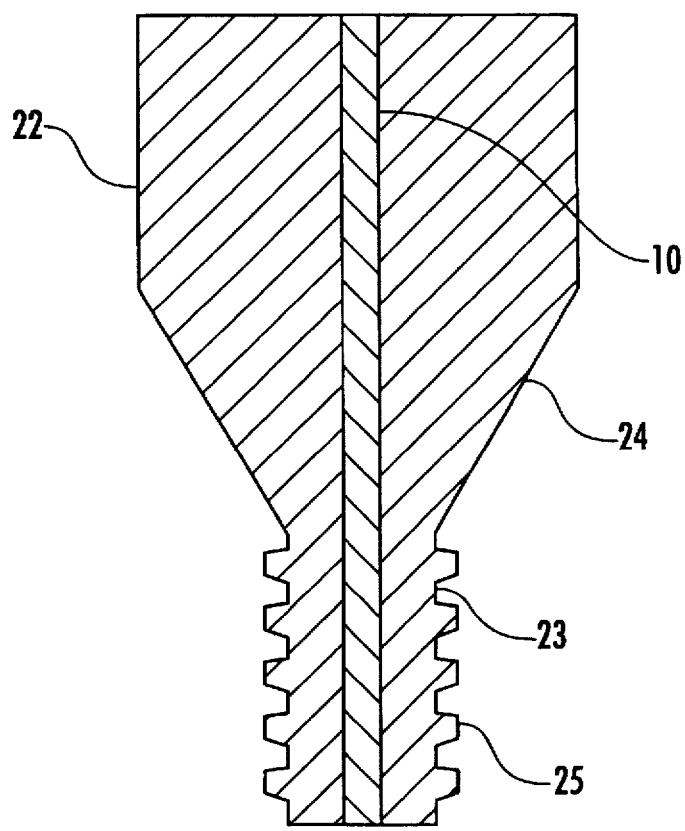
Figure 4:
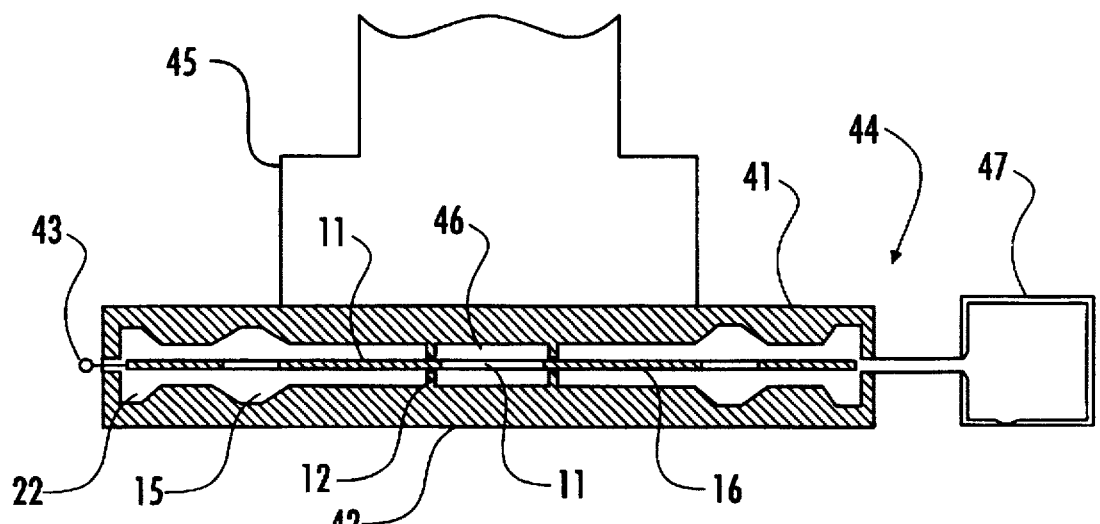
Figure 5:
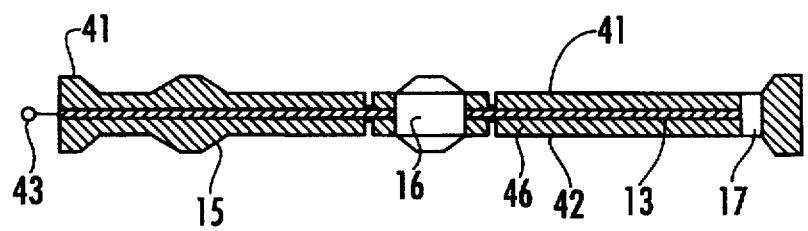
Figure 6:
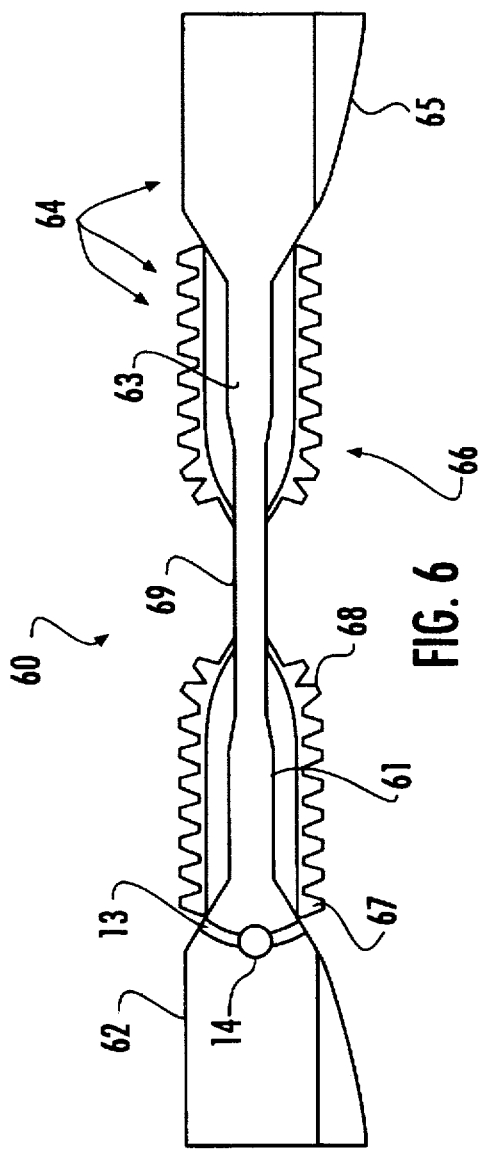

FIG. III is a partial cross sectional view of the filter plate of the invention.

FIG. IV is a diagrammatic view of the filter plate within a mold press.

FIG. V is a partial cross sectional view of the filter plate of the invention through line A—A of FIG. I.

FIG. VI is a partly diagrammatic section through the membrane filter plate in accordance with the invention.

DETAILED DESCRIPTION OF PREFERRED EMBODIMENTS

The filter plates of the invention are characterized by an inner steel sheet and front and back panels composed of thermoplastic resin. All of the steel surfaces are encased by thermoplastic synthetic resin.

Characteristically, the filter plates of the invention may be of any size commonly employed in the art. Typically, such sizes range from about 500×500 mm to about 2000 mm×1500 mm. The thickness of the plates typically ranges from between 50 to about 75 mm. The filter plates are composed of an inner steel plate, a side panel, a front panel and a back panel.

The inner steel plate 10 of the invention is illustrated in FIG. I. The dashed lines of FIG. I illustrate a preferred embodiment of the invention and represent prefabricated cut-out holes in the steel plate; the solid lines represent the openings in the filter plate and further represent the contours of the finished filter plate (subsequent to the injection of the thermoplastic synthetic resin). In normal circumstances, the prefabricated openings in the steel plate are about 25% larger than the opening in the constructed filter plate.

The inner steel plate of the invention contains a feed hole 16. The feed hole receives the incoming feedstream. Typically, there is only one feed hole per plate. The feed hole may be at any location of the filter plate. In a preferred embodiment, the feed hole is located in the center of the filter plate. The diameter of the feed hole is normally between from about 2" to about 6".

The steel plate is further characterized by a series of prefabricated openings. A series of connection holes 12 are used to bond the front and back panels of the filter plate together. These are small holes having a diameter measuring from about 1 inch to about 2 inches. The number of connection holes in the steel plate is generally between from 4 to 16, preferably around 12.

The openings 19, encircling feed hole 16, are used in the manufacturing process for guiding pins. Such pins serve to resist deflection of the steel sheet during the injection cycle of the process. The inner steel plate further may contain openings 48 along its outer perimeter for insertion of additional guiding pins.

The inner steel plate further contains at least one drainage channel 13 which serve as the receptor for the liquid separated from the feedstream. The separated liquid exits the filter plate via port holes on the outer surface of the front and/or back panels. The drainage channel may consist of any geometric shape. Illustrated in FIG. I are a series of tapered drainage channels cut into a V-shape; the narrowest portion of the drainage channel directed towards the center of the filter plate. Typically, the diameter of the drainage channel of the filter plate is between about 12 mm to about 20 mm. The drainage channel may exit the filter plate via corner cavity 17 which is typically perpendicular to the channel; the drainage channel leading into the corner cavity. The corner cavity should be of a sufficient size to adequately expel the outgoing liquid stream. Typically, the diameter of the corner cavity is about 25 mm to about 75 mm. Alternatively, the drainage channel may feed directly to the outer edge of the filter plate.

The inner steel sheet may further contain support boss holes 15 to give added rigidity to the filter plate. When present, the number of support bosses typically range from 4 to 8 (as shown in FIG. I). The support boss holes usually have a diameter of from about 2 inches to about 3 inches.

The front and back panels of the filter plate are bonded to the inner steel sheet through the connection holes and support boss holes; the thermoplastic synthetic resin extending, during curing, from the front to the back panels of the filter plate through the connection holes and support boss holes.

The support bosses of the filter plate laterally extend from the plane of the inner steel sheet and are typically configured as a beveled surface having a broadening diameter from the front (or back) panel to the inner steel sheet. Support boss configurations of filter plates are well documented in the art. See, for instance, U.S. Pat. No. 4,781,829, herein incorporated by reference.

The outermost perimeter of feed hole 16 consisting of cured thermoplastic synthetic resin; the steel layer surrounding all of the prefabricated openings and drainage channel also being encased by cured thermoplastic synthetic resin.

FIG. II illustrates the external front view and FIG. III is a partial cross-sectional view of a filter plate in accordance with the invention. The front panel 20 and back panel (identical to the front panel) enveloping themselves around the inner steel sheet. As such, the front and back panel, as well as side panel 21, are composed of the hardened thermoplastic synthetic resin. Port holes 14 lead into the drainage channel.

In one embodiment of the invention, the front and back panels of the filter plate—especially when used as the body plate in a membrane filter plate—are relatively smooth surfaces, being non-contoured.

In an alternative embodiment, the front and back panels of the filter plate may be defined by sealing edge frame 22 and central planar surface 23; the latter being recessed within the sealing edge frame. Line 18 of FIG. I illustrates the boundary of the sealing edge frame from the central planar surface of the filter plate on the steel sheet. The peripheral frame surrounds the inner steel sheet and connects the front and back panels in a solvent-tight arrangement to the inner steel sheet.

Typically, the central planar surface is connected to the sealing edge frame by an obliquely extending lip 24 which extends at an angle of approximately 10° to about 45° from the sealing edge frame to the central planar surface, preferably about 45°. When present on such filter plates, the corner holes 17 typically reside on the sealing edge frame. The central planar surface 23 of the front and back panels of the filter plate of the invention typically contain a series of either grooved, ribbed or ridged surfaces 25, collectively called "spacing ribs" directed towards the outside of the plate and facing the filter cloth in operation.

The filter plates of the invention are preferably produced by an injection molding process diagrammatically represented in FIG. IV. FIG. V further illustrates a cross-sectional view through line A—A of FIG. I of the filter plate of the invention. In the molding process, the steel sheet 10 is first inserted between the upper 41 and lower 42 regions of the mold 44. The mold is held together in a mold press 45 to withstand the injection pressure. After the mold is closed and pressurized, the synthetic resin is shot into it by injection unit 47. Under normal operations, thermoplastic synthetic resin is injected into the mold at a pressure of approximately 1,000 to about 1,500 psi and the amount of pressure within the mold is between from about 2,000 to about 3,000 tons. The temperature within the mold is generally between from about 90° to about 300° F.

The prefabricated steel sheet has the desired number of connection holes 12, support boss holes 15, corner holes 17 and central feed holes 16. The resin is permitted to fill the connection holes, support boss holes (if present), corner holes (if present) and central feed hole until the resin completely envelops all of the exposed surfaces of the steel plate.

The steel plate is typically centered within the mold by a suitable means which will resist deflection of the steel sheet during the high pressure injection cycle. Suitable means for resisting deflection include a series of guiding pins 43 positioned on the outside perimeter 48 of the mold and within the center of the mold 46. FIG. I further illustrates the placement of guiding pins on the outside perimeter 48 of the mold. Openings 19 are for the insertion of the guiding pins.

The mold is designed such that its upper and lower regions, which will define the front and back panels, contain ridged or grooved surfaces for the formation of spacing ribs to be turned toward the direction of the filter cloth while the filter plate is in use.

The channel passageway leading from the corner eye is defined in the prefabricated steel sheet. Prior to injection of the synthetic resin, it is most desirable to insert a pin into the passageway from the side of the steel sheet to define the passageway during the injection molding process.

After curing the thermoplastic synthetic resin and cooling the mold under pressure, the mold is opened and the steel encapsulated filter plate is extracted. Any opening exposing the steel can be plugged with a similar type thermoplastic material to prevent any exposure of the steel surface(s) to the filter media; processes used typically being spin welding or hotplate welding, by conventional techniques well known in the art.

In a preferred embodiment of the invention, the above-described filter plate is used as the body plate for a membrane filter plate. When so used, the design parameters of the mold are such that the front and back panels of the resultant body plate lie in the same horizontal plane as the inner steel sheet. Alternatively, the front and back panels of the body plate may contain a sealing edge frame and a central planar surface recessed within the edging frame as depicted in FIG. II. It is unnecessary, however, for either the front or back panels of the body plate of the membrane filter plate to contain either ridged or grooved surfaces. Exemplary of a body plate for use in the invention is that depicted in FIG. III without the spacing ribs 25.

The inner steel sheet 10, as illustrated in FIG. I, may be used therefore in the production of the body plate and, in such, is encased by thermoplastic synthetic resin. The body plate contains feed port 16 extending from the exterior of the front and back panels through the steel layer for the flow of fluid through the filter plate. Connection holes further extend from the exterior of the front and back panels. Drainage channel 13 carries the extracted liquid from the port holes which are located on the filter element. All of the prefabricated openings and passageways of the steel sheet are encased by thermoplastic synthetic resin.

The front and back panels of the body filter plate are bond to the inner steel sheet through the connection holes and (optional) support boss holes; thermoplastic synthetic resin extending from the front to back panels of the filter plate through the connection holes and support boss holes.

The invention further relates to a membrane filter plate consisting of the body plate and filter element. FIG. VI is a partly diagrammatic section through the membrane filter plate in accordance with the invention. The membrane filter plate 60 comprises a body plate 61, as set forth above, consisting of an inner steel sheet and front and back panels consisting of thermoplastic synthetic resin. The front and back panels of the body plate may be within the same horizontal plane as the inner steel sheet or (as set forth in FIG. VI) contain an outer peripheral frame 62 and a recessed central planar panel 63 bound by the peripheral frame. The front and back panels of the body plate do not typically contain spacing ribs.

Overlaying the front and back panels of the body plate is filter element 64. The filter element is characterized by an outer sealing edge frame 65 and a generally planar panel 66 having a bend zone 67 with spacing ribs 68. Such filter elements are known in the art. See, for instance, U.S. Pat. No. 4,997,560 as well as U.S. Pat. No. 5,021,155, both of which are herein incorporated by reference. The peripheral frame and central panel of the filter element, as well as front and back panels of the body plate, are composed of thermoplastic synthetic resin.

If desired, circumferential edging surfaces may further surround the recessed portion of the filter element. The corner holes, when present, are located on the peripheral frame of the filter element.

The filter element further contains cavity 69 which is of the same dimensions and may be aligned with feed hole 16 of the body plate. The external surface of the filter element further contains at least one port hole. Fluid draining from the front and back filter elements of the membrane filter plate enter the port holes and exit the filter plate via the drainage channel.

The filter element is attached to the front and back panels of the body plate principally at the peripheral edge. The filter element may contain support bosses, complementary aligned with the stayboss supports of the body plate. In a preferred embodiment, the filter element is further attached to the body plate at feed hole 16. Since the front and back panels of the body mold are composed of thermoplastic resin and since the filter element is composed also of thermoplastic resin, the filter element may be easily welded onto the front and/or back panels of the body mold. Conventional spin welding and hotplate welding processes conventional in the art may be employed. Alternatively, the filter element may be mechanically secured onto the front and back panels and around the feed hole of the body plate by bolts, etc.

A portion of the thermoplastic synthetic resin is then removed from the cavity 69 defining the central feed hole to create a passageway which extends from the front panel to the back panel of the membrane filter plate. The outermost perimeter of the passageway consists of hardened thermoplastic synthetic resin which surrounds the inner steel sheet. Thermoplastic synthetic resin is further removed from the corner hole, if employed.

The thermoplastic synthetic resin for use in the invention may be a homo- or co- polymer of propylene as well as glass filled polypropylene or polyvinylidene fluoride (PVDF). When the fluid is warm, a 10% to 20% glass filled homopolymer is especially preferred. Copolymers of propylene are desired where moderate temperatures or cold wash fluids are employed. The steel sheet may be substituted with an alternative metal sheet if so desired.

The first steps in manufacturing the body plate for the membrane filter plate proceed in a similar fashion to that described above. The prefabricated steel sheet is inserted between the upper and lower regions of an open mold, preferably being centered within the mold by the deflection resistant means discussed above. The thermoplastic synthetic resin is then injected into the mold under the pressures and temperature conditions recited above. The synthetic resin is allowed to fill the connection holes, support boss holes (if present), corner holes (if present) and central feed hole until it encases all of the exposed surfaces of the steel sheet. Prior to injection of the thermoplastic synthetic resin into the mold, form-defining pins are inserted into the channel which extends from the corner hole. The thermoplastic synthetic resin is then hardened. The front and back panels of the body plate may be completely planar with the inner steel sheet or have a recessed central planar face with edging frame.

Various modifications may be made in the nature, composition, operation and arrangement of the various elements, steps and procedures described herein without departing from the spirit and scope of the invention as defined in the following claims.

What is claimed is:

1. A filter plate comprising an inner steel sheet having front and back surfaces, a series of prefabricated openings extending through the inner steel sheet from said front surface to said back surface, and front and back panels composed of thermoplastic synthetic resin and bonded to the front and back surfaces of the inner steel sheet, respectively, by hardened thermoplastic synthetic resin filling the prefabricated openings; said filter plate further containing a passageway for supporting a flow of fluid through the filter plate and a drainage channel leading to an outside of the steel sheet; all of the steel of said filter plate including that surrounding the passageway and the drainage channel being enveloped by thermoplastic synthetic resin.

2. The filter plate of claim 1, wherein the prefabricated openings are connection holes.

3. The filter plate of claim 1, wherein the prefabricated openings are support boss holes.

4. The filter plate of claim 1, wherein the prefabricated openings are connection holes and support boss holes.

5. The filter plate of claim 1 wherein the thermoplastic synthetic resin is polypropylene.

6. The filter plate of claim 1 wherein the front and back panels are characterized by an edging frame and a central planar recessed surface within the edging frame.

7. The filter plate of claim 6, further comprising a cavity at the corner of said edging frame of the front and back panels, said corner connected to the drainage channel, wherein the cavity extends from the front panel to the back panel; all of the steel around the perimeter of said corner cavity and said channel being overlaid by thermoplastic synthetic resin.

8. The filter plate of claim 1, further comprising a cavity which extends from the front panel to the back panel and which connects to the drainage channel; all of the steel around the perimeter of said cavity and said channel being overlaid by thermoplastic synthetic resin.

9. The filter plate of claim 1, wherein the drainage channel extends to an outer surface of the filter plate.

10. A filter plate comprising an inner steel sheet having front and back surfaces, and a front and back panel, the front and back panels composed of thermoplastic synthetic resin and characterized by an edging frame and a central planar recessed surface within the edging frame, said central planar recessed surface containing spacing ribs; the inner steel sheet having a series of prefabricated holes extending therethrough from the front surface to the back surface, the front and back panels bonded to the front and back surfaces of the inner steel sheet, respectively, by hardened thermoplastic synthetic resin filling the prefabricated holes; said filter plate further comprising at least one port hole on the front or back panel extending into an internal drainage channel leading to an outside of the filter plate; said filter plate further containing a passageway extending from an exterior of the front and back panels through the inner steel sheet; all of the steel in said filter plate being enveloped by the thermoplastic synthetic resin.

11. The filter plate of claim 10, wherein the thermoplastic synthetic resin is polypropylene.

12. The filter plate of claim 10, wherein the prefabricated openings are support boss holes.

13. The filter plate of claim 10, wherein the prefabricated openings are connection holes.

14. The filter plate of claim 10, wherein the prefabricated openings are connection holes and support boss holes.

15. The filter plate of claim 10, further comprising a cavity at the corner of the edging frame of the front or back panel, said cavity being connected to the internal drainage channel, wherein the cavity extends from the front panel to the back panel; all of the steel around the perimeter of said cavity and said channel being overlaid by thermoplastic synthetic resin.

16. The filter plate of claim 10, wherein the internal drainage channel extending from the port hole leads to the outer perimeter of the filter plate.

17. A membrane filter plate comprising
(A) a body comprising an inner steel sheet having front and back surfaces, a series of prefabricated openings extending through said inner steel sheet from said front surface to said back surface, and front, back, and side panels composed of thermoplastic synthetic resin and bonded to the front and back surfaces of the inner steel sheet, respectively, by hardened thermoplastic synthetic resin filling the prefabricated openings of the inner steel sheet;
(B) at least one filter element adjacent to the front and back panels of the body plate, said filter element comprising a peripheral frame and a central panel having a bend zone, the peripheral frame of said filter element being secured to the front or back panel of the body plate;
(C) a passageway extending from an outer surface of the filter element through the body plate;
(D) at least one port hole in the peripheral frame of the filter element and extending into an internal drainage channel;

all of the steel of the body plate being enveloped by the thermoplastic synthetic resin.

18. The membrane filter plate of claim 17, wherein the thermoplastic synthetic resin of the front, back and side panels of the body plate is polypropylene.

19. The filter plate of claim 17, wherein the prefabricated holes of the body plate are connection holes.

20. The filter plate of claim 17, wherein the prefabricated holes of the body plate are support boss holes.

21. The filter plate of claim 17, wherein the prefabricated holes of the body plate are connection holes and support boss holes.

22. The filter plate of claim 17, wherein the front and back panels of the body plate are characterized by an edging frame and a central planar recessed surface within the edging frame.

23. The filter plate of claim 17, further comprising a cavity which extends from the peripheral frame of the filter element through the body plate, said cavity connected to the drainage channel; all of the steel around the perimeter of said cavity and said channel in the body plate being overlaid by thermoplastic synthetic resin.

24. The filter plate method of claim 17, wherein the drainage channel leading from the port hole extends to an outermost surface of the filter plate.

25. The filter plate of claim 17, wherein the filter element is composed of thermoplastic synthetic resin.

* * * * *